United States Patent [19]

Iino et al.

[11] Patent Number: 5,070,323

[45] Date of Patent: Dec. 3, 1991

[54] DISPLAY FOR VEHICLE

[75] Inventors: Tadashi Iino; Kunimitsu Aoki, both of Susono, Japan

[73] Assignee: Yazaki Corporation, Tokyo, Japan

[21] Appl. No.: 364,234

[22] Filed: Jun. 12, 1989

[30] Foreign Application Priority Data

Jun. 17, 1988 [JP] Japan .............................. 63-79539[U]

[51] Int. Cl.$^5$ ........................................... G09G 3/00
[52] U.S. Cl. ................................... 340/705; 340/980; 353/13; 353/14; 359/618; 359/602
[58] Field of Search ................ 340/705, 980; 350/174, 350/3.7, 3.74, 314; 353/13, 14; 358/252, 253

[56] References Cited

U.S. PATENT DOCUMENTS

| | | | |
|---|---|---|---|
| 2,750,833 | 6/1956 | Gross | 350/174 |
| 3,744,879 | 7/1973 | Beard et al. | 350/3.74 |
| 3,885,095 | 5/1975 | Wolfson et al. | 350/174 |
| 4,447,128 | 5/1984 | Ferrer | 350/3.7 |
| 4,457,579 | 7/1984 | Thylén | 350/174 |
| 4,582,394 | 4/1980 | Boyd | 350/174 |
| 4,808,978 | 2/1989 | Vernay | 340/705 |
| 4,886,328 | 12/1989 | Iino | 340/980 |

FOREIGN PATENT DOCUMENTS

| | | | |
|---|---|---|---|
| 0142143 | 9/1985 | Japan | 340/705 |
| 62-47431 | 3/1987 | Japan | |
| 63-192134 | 12/1988 | Japan | |
| 63-202529 | 12/1988 | Japan | |

Primary Examiner—Jin F. Ng
Assistant Examiner—Dov Popovici
Attorney, Agent, or Firm—Venable, Baetjer, Howard & Civiletti

[57] ABSTRACT

A display for a vehicle arranged such that displays indicating driving information such as engine speeds, water temperatures and so on are disposed in the portion other than the dash board of the vehicle whereby information form the displays can be visibly recognized form the driver's seat by projecting the same to a reflecting member disposed in the portion of the instrument panel in the dash board wherein semi-transmissable cover plates are provided on the front surfaces of the displays confornting the reflecting member as to reduce an influence of light from outside of vehicle through the windshield glass, to prevent reduction in the contrast of the display image for the purpose of obtaining a display image exhibiting excellent visibility and quality.

12 Claims, 5 Drawing Sheets

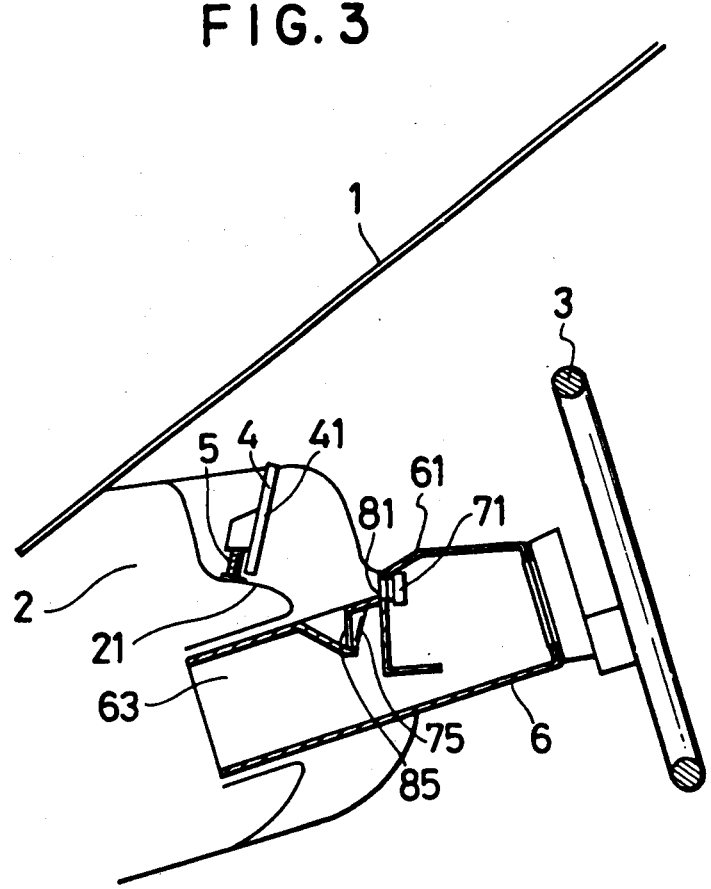

DISPLAY FOR VEHICLE

BACKGROUND OF THE INVENTION

1. Field of the Invention

The present invention relate to a display for a vehicle arranged in such a manner that driving information of a display disposed in any portion other than the dash board is displayed in the instrument panel portion of a dash board with an aid of a reflector.

2. Prior Art

There is a known display for a vehicle arranged in such a manner that displays for indicating a variety of information needed to drive a vehicle such as the engine speed, water temperature and the like are disposed in any portion other than the dash board of a vehicle so that this information projected to a reflecting member disposed in the instrument panel portion of the dash board can be recognized at the driver's seat.

The above-described display can be exemplified by a structure arranged in such a manner that a display accommodating portion is formed within a column cover surrounding a steering shaft positioned between a windshield glass and a driver's seat so that displays are accommodated in the space formed by the column cover and the display accommodating portion, the thus-formed space being positioned relatively adjacent to the windshield glass. Furthermore, a reflecting member whose reflecting surface is faced to the driver's seat is disposed on the dash board. As a result of the presence of this reflecting member, the contents of display of the above-described displays can be recognized at the driver's seat due to the reflection.

Therefore, the meter hoods needed conventionally can be omitted from the layout of the dash board and a significantly large space can be secured in the dash board since only this reflecting member is present in the area on the dash board.

However, a display of the type described above arises the following problem: when outer light made incident through the windshield glass directly reaches the display, the segment other than the light emitting segment can be made brighter even if this display comprises a display element of a light emitting type, causing the difference between the luminance of the segment other than the light emitting segment and that of the light emitting segment to be substantially erased. As a result, a so-called "Washout" phenomenon in which the contrast of the image of display can be reduced occurs, causing the visibility to be excessively deteriorated.

SUMMARY OF THE INVENTION

An object of the present invention is to overcome the above-described problem.

According to the present invention a display for a vehicle can be provided, which is arranged such that the display contents indicated by display means disposed in a portion of a dash board between the windshield glass and a driver's seat of the vehicle is arranged to be reflected to the driver's seat by a reflecting member disposed in the instrument panel of the dash board, the display being characterized in that cover plates whose transmissivity can be changed are provided on the front surfaces of the display means so that the intensity of light from outside of the vehicle is reduced in the optical system of the display means.

The intensity of the light from outside of the vehicle to be made incident upon and reflected by the displaying surface of the display which is arranged to be reflected to the above-described reflecting member can be damped by the above-described semi-transparent cover plate when the same is made incident and reflected to the reflected member. However, the intensity of the display image due to the light emission of the display is damped by the semi-transparent cover plate only when the display image is reflected to the reflected member. Therefore, the influence of the light from outside of the vehicle which can cause the deterioration in the contrast of the display image can be reduced. As a result, a display image exhibiting excellent visibility and display quality and whose contrast can be protected from reduction can be obtained since the wash-out phenomenon due to the incidental light from outside of the vehicle can be prevented.

BRIEF DESCRIPTION OF THE DRAWINGS

FIG. 3 is a side elevational cross-sectional view which illustrates the display for a vehicle shown in FIG. 1;

FIGS. 4A and 4B are views which illustrate the principle of the prevention of reduction in the contrast of the display image due to the light from the outside of the vehicle by virtue of the display according to the present invention, wherein FIG. 4A is a view which illustrates the contrast realized by the conventional display, FIG. 4B is a view which illustrates the contrast realized by the display according to the present invention;

DESCRIPTION OF THE PREFERRED EMBODIMENTS

Figure 1:
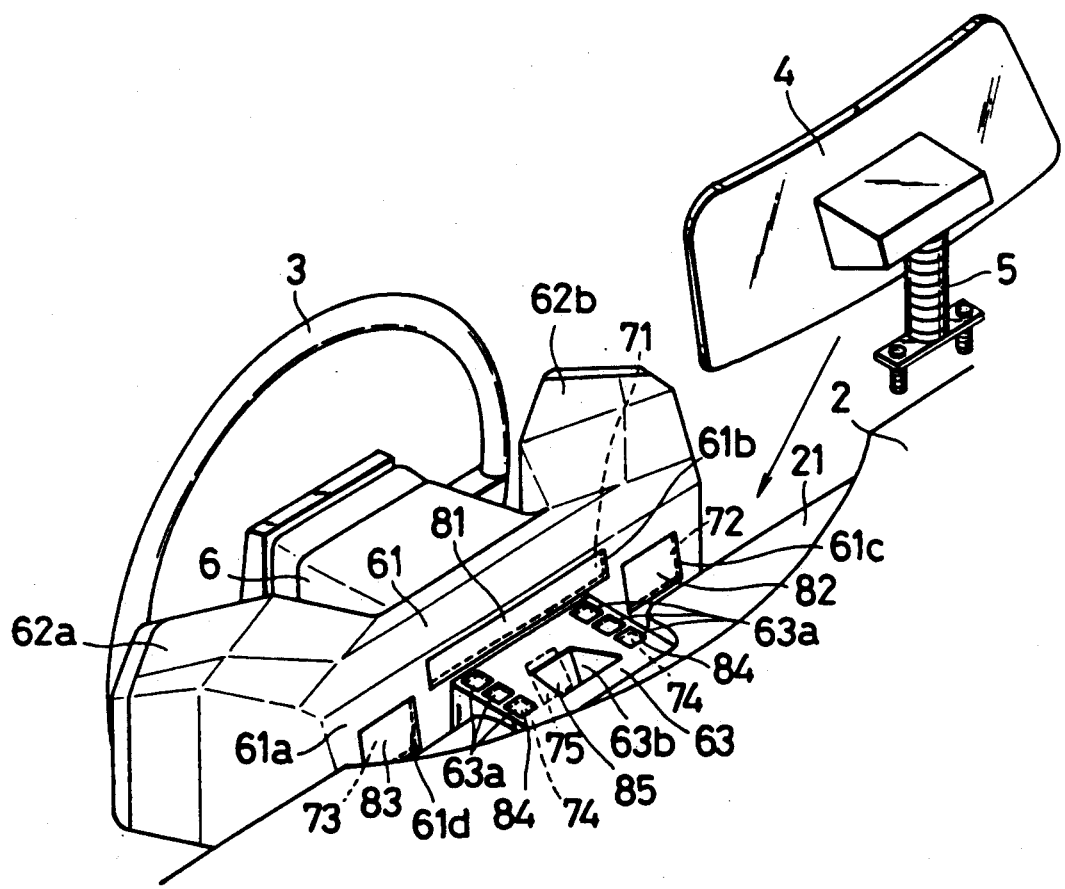
FIG. 1 is a partial, exploded, and perspective view which illustrates a display for a vehicle according to the present invention when the same is viewed from the windshield glass.
Figure 2:
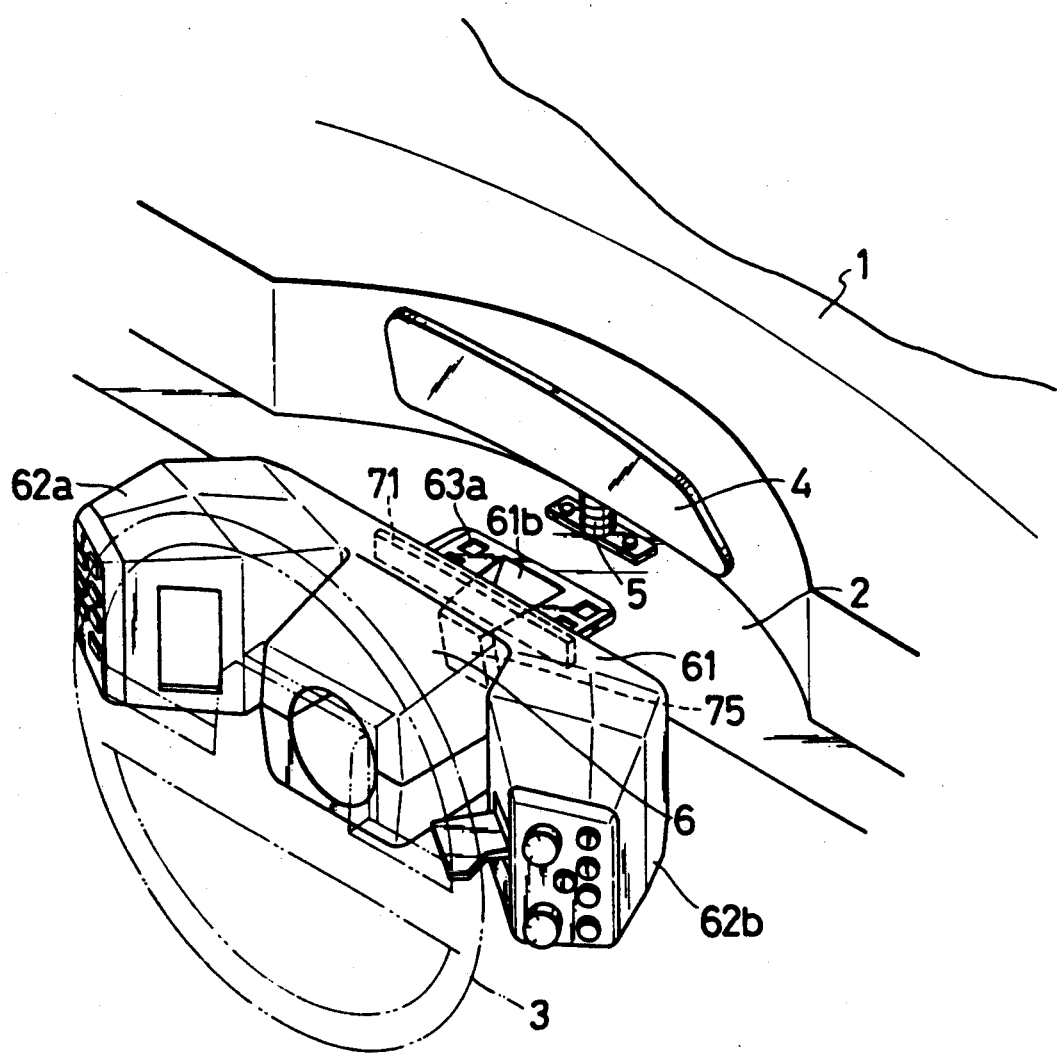
FIG. 2 is a perspective view which illustrates the display for a vehicle when the same is viewed from the driver's seat.

Referring to FIGS. 1 to 3, in a vehicle, a dash board is disposed between a windshield glass 1 and a steering wheel 3. The dash board 2 projects over the lower end portion of the windshield glass 1 toward the inside of the compartment of the vehicle. A step portion 21 is formed by cutting the dash board at the position at which the instrument panel is disposed. A reflecting member 4 is disposed on this step portion 21 with a support member 5, and a reflecting surface 41 of this reflecting member 4 is faced the driver's seat at the position of the instrument panel. FIG. 1 illustrates a state where the reflecting member 4 and the supporting member 5 are removed.

The reflecting member 4 is made of a transparent plastic plate having the reverse side thereof applied with black coating or made of a black plastic plate. This reflecting member 4 is formed in a shape of substantially a rectangle whose longer side is arranged to be lateral direction of the vehicle, and the reflecting surface 41 thereof is slightly warped in the lateral direction of the vehicle as to form a concave plane and is as well inclined downward slightly as to be supported by the supporting member 5.

Reference numeral 6 represents a column cover surrounding a steering column (omitted from illustration) which connects the steering wheel 3 and a steering mechanism in the engine room. This column cover 6 is slightly inclined forward along the steering shaft, and the portion of it which opposes the end portion corresponding to the steering wheel is inserted into the dash board 2.

The uppermost level of the end portion of the column cover 6 to be connected to the steering wheel is arranged to be substantially the same level as that of the upper step portion 21 of the dash board 2. With this height maintained, the upper surface of the column cover 6 is allowed to project upwards over the side end portion of the steering wheel to the intermediate portion of the same. The two sides of the column cover 6 are allowed to project in the lateral direction of the vehicle at the intermediate portion of the steering wheel so that a portion 61 for accommodating a display is formed.

The laterally projecting portions of the portion 61 for accommodating the display are further allowed to project to the behind portion of the portion 61 for accommodating the display, that is, further project to the steering wheel so that portions 62a and 62b for accommodating switches are formed. The thus-formed switch accommodating portions 62a and 62b are provided with switches for a variety of vehicle equipments so that these switches can be operated by a finger with the steering wheel 3 grasped by the other fingers.

A surface 61a of the display accommodating portion 61 which opposes the reflecting surface 41 of the reflecting member 4 is formed with windows 61b, 61c, and 61d. As a result, the display accommodating portion 61 accommodates an engine speed display 71 for bar-indicating engine speeds, a water temperature indicator 72 for bar-indicating water temperatures, and a fuel level indicator 73 for bar-indicating the fuel level with the display surfaces allowed to confront the corresponding windows 61b, 61c, and 61d.

A display accommodating portion 63 is formed in the column cover 6 adjacent to the dash board 2, this display accommodating portion 63 having an upper surface formed with two rows of windows 63a and concave portion 63b having a V-shaped cross-sectional shape. This display accommodating portion 63 accommodates a display 74 for issuing an alarm such as ajar door or a state of the seat belt and so on such that the display surface thereof confronts the windows 63a, while a display 75 for indicating the car speeds is accommodated in the same with the display surface thereof confront the reflecting member 4 in the concave portion 63b.

Semi-transmissive cover plates 81 to 85 for reducing the amount of the incidental light are respectively disposed at the front surfaces of the display 75 in the concave portion 63b. As a result of the semi-transmissivity of these cover plates 81 to 85, the reduction in the display contrast due to the light from outside of the vehicle is prevented. As the display to be accommodated in the display accommodating portions 61 to 63, a self-light emitting type display can be used such as a fluorescent display tube, light emitting diode, a transmissible liquid crystal provided with a back-light.

Figure 5:
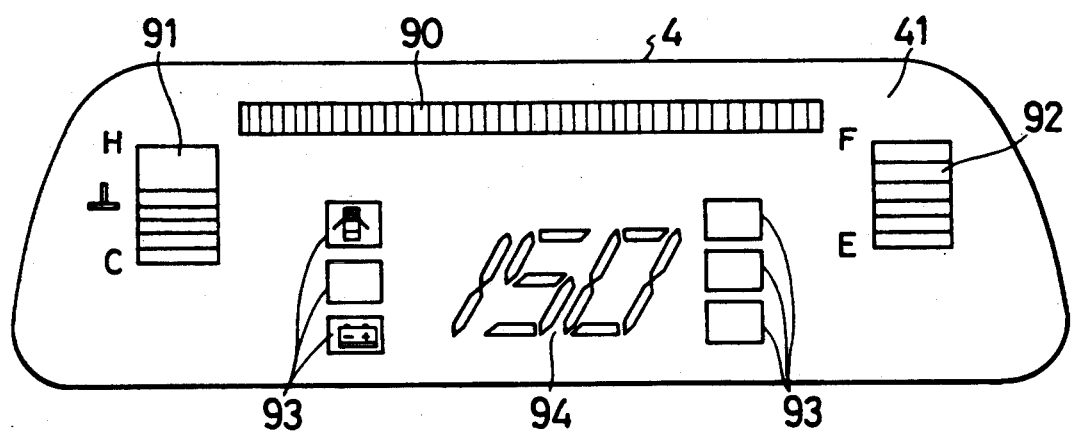
FIG. 5 is a view which illustrates an example of a display realized by the display according to the present invention.

The display which can be recognized within the region of the reflection surface 41 of the reflecting member 4 by a driver by virtue of the arrangement of the displays 71 to 75 is as shown in FIG. 5. Referring to this drawing, engines speeds, temperatures, and fuel levels with bars are indicated at reference numerals 90, 91, and 92 respectively. Displays of alarms are indicated at reference numeral 93 and car speeds are indicated at reference numeral 94.

FIGS. 4A and 4B are views which illustrate the principle of prevention of reduction in the contrast realized by this embodiment.

In a case of the conventional display in which any cover plate is not provided (see FIG. 4A), assuming that the transmissivity of the cover plate 81 is T, reflection rate of the segment surface of the display is R, light emitting brightness of the segment of the element surface of the display is B, and the intensity of light from outside of the vehicle is I, the visible brightness $I_{ON}$ of the emitting segment and the visible brightness $I_{OFF}$ of the segment which does not emit light are respectively expressed by:

$$I_{ON} = B + IR, \quad I_{OFF} = IR$$

The contrast ratio Cr of the segments is expressed by:

$$Cr = \frac{I_{ON}}{I_{OFF}} = \frac{B + IR}{IR}$$

On the other hand, in the case according to the present invention and in which the semi-transmissible cover plate is used, assuming that the brightness $I_{ON}'$ of the emitting segment to be recognized through the cover plate 81 and the brightness $I_{OFF}'$ of the segment which does not emit light are respectively expressed by:

$$I_{ON}' = BT + IT^2R, \quad I_{OFF}' = IT^2R$$

The contrast ratio Cr' is expressed by:

$$Cr' = \frac{I_{ON}'}{I_{OFF}'} = \frac{BT + IT^2R}{IT^2R}$$

In this case, since T represents the transmissivity, T is smaller than 1. Then the difference in contrast Cr'-Cr can be given from:

$$Cr' - Cr = \frac{BT(1 - T)}{IT^2R} > 0$$

As can be clearly seen from this formula, by using the semi-transmissible cover plate, the contrast ratio can be raised. Although the contrast ratio of the display image can be raised by lowering the transmissivity (T) of the cover plate, the display brightness can be lowered. That is, although the display image becomes visible even if there is sun shine by lowering the contrast, the quality of the display can be worsened. In order to overcome this problem, the transmissivity (T) of the cover glass needs to be adjusted as to obtain the most suitable contrast for the intensity (I) of the brightness of light from outside of the vehicle.

Figure 7:
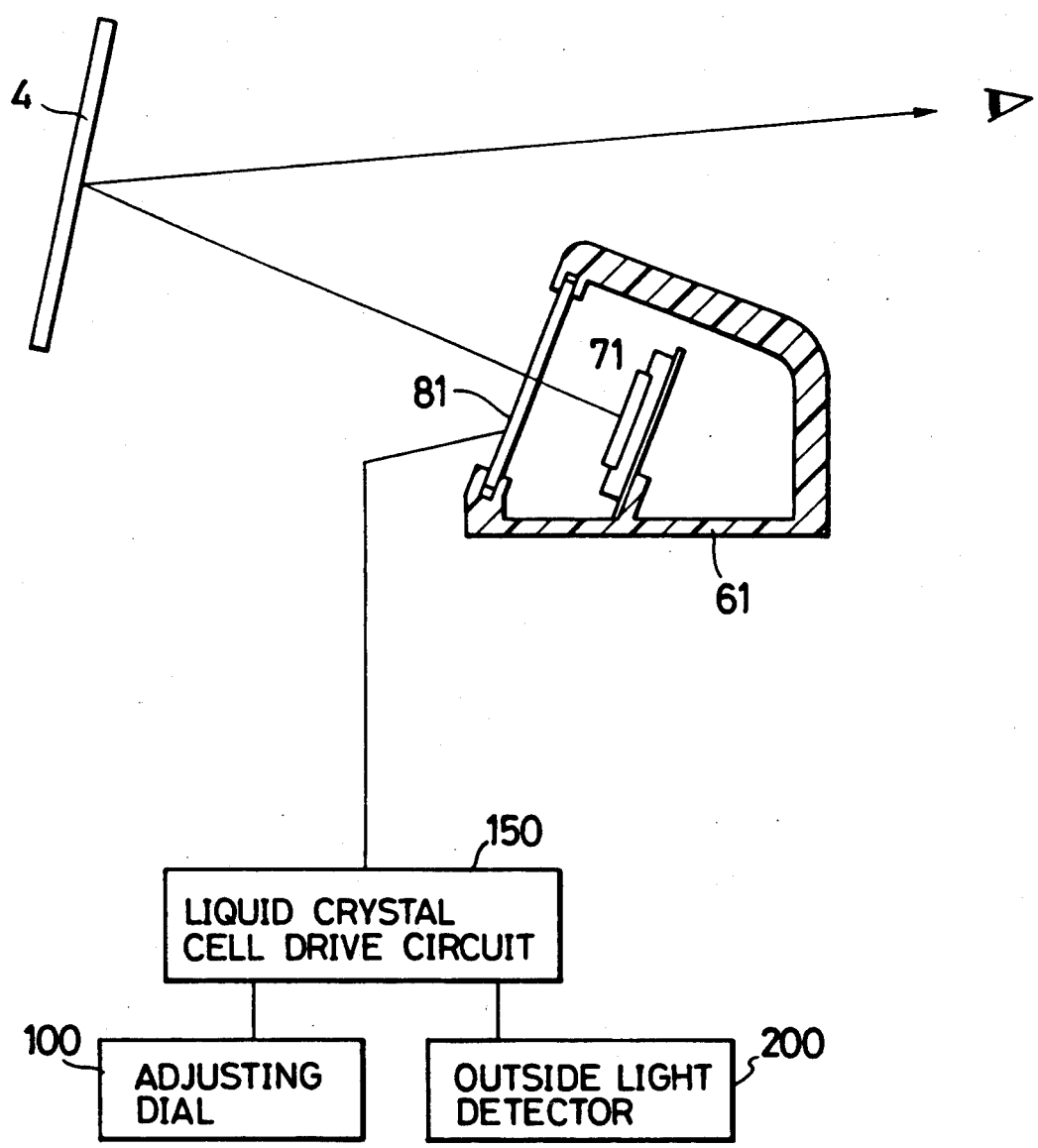
FIG. 7 is a view which illustrates an embodiment of the present invention in which liquid crystal cells are used in the cover plate whose rate of transmissivity is varied.

An example of a method of varying the transmissivity (T) by changing the level of the voltage applied to liquid crystal cells employed is shown in FIG. 7. That is, the cover plates 81 to 85 comprise liquid crystal cells in which liquid crystal is enclosed so that an voltage can be applied to the liquid crystal via a liquid crystal cell drive circuit 150. When the level of the drive voltage is changed, the arrangement of the liquid crystal molecules is changed, causing the incidental light to be polarized and the transmissivity of it to be changed. The level of this voltage to be applied can be set to a level desired by a driver by adjusting an adjusting dial 100. Alternately, it can be automatically set to a predetermined level by the output from an outside light detector 200 disposed adjacent to the reflecting plate 4, this output being transmitted on the basis of the intensity of the brightness of the light from outside of the vehicle.

Figure 6A:
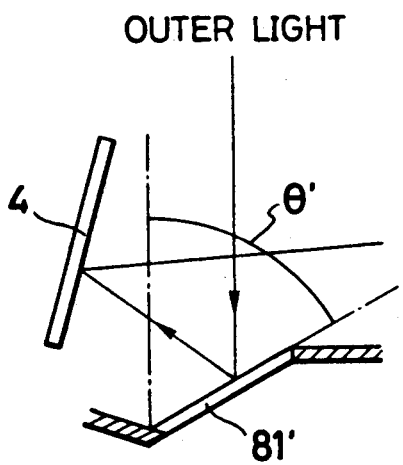
FIGS. 6A and 6B are views which illustrates the angle of mounting the cover plate of the display according to the present invention.
Figure 6B:
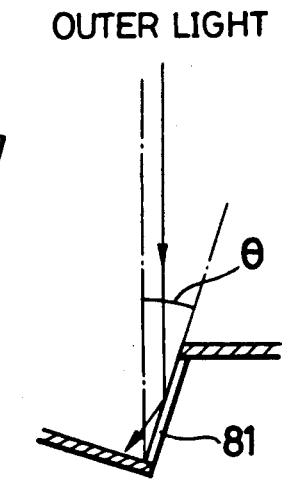

FIGS. 6A and 6B are views which illustrate the mounting angle of the cover plate 81 with respect to the incidental direction of light from outside of the vehicle. If the mounting angle $\theta'$ of the cover plate 81' were not arranged to be a range of proper angles as shown in FIG. 6A, light reflected from the surface of the cover plate 81' can be reflected toward the driver's seat by the reflecting member 4, causing the visibility to be deteriorated.

Therefore, the mounting angle of the cover plates 81 to 85 needs to be determined to a proper range on the basis of the incidental direction of light from outside of the vehicle, the direction of the reflecting surface 41 of the reflecting member 4, and the position of the displays 71 to 75. The cover plate 81 needs to be mounted at a proper mounting angle $\theta$, for example, as shown in FIG. 6B, for the purpose of preventing reflection of the light reflected from the surface of the cover plate 81 to the driver's seat. The mounting angle may be optionally adjusted in a proper range.

The cover plates according to the present invention are not limited to the above-described liquid crystal cells whose transmissivity can be electrically changed. The cover plates may use a photochromic material whose transmissivity can be changed due to reflection to ultraviolet rays of sun beam.

We claim:

1. A display for a vehicle comprising:
    an instrument panel disposed between a windshield glass and a driver's seat of a vehicle;
    a reflecting member disposed on said instrument panel, said reflecting member having a reflecting surface that faces said driver's seat;
    a light-emitting display means, disposed between said windshield glass and said driver's seat of the vehicle, for displaying driving information by emitting light, said display means having a display surface which displays said driving information and which faces said reflecting surface, wherein said driving information is projected onto said reflecting surface from said display surface and reflected from said reflecting surface in the general direction of said driver's seat; and
    contrast means for controlling the contrast between light-emitting portions of said display surface and non-light-emitting portions of said display surface such that said contrast is sufficiently high as to be visible from said driver's seat in the presence of exterior light impinging on said display surface, said contrast means comprising a cover plate of a semi-transmissive material that reduces the brightness intensity of exterior light impinging on said display surface, said cover plate positioned between said display surface and said reflecting member such that exterior light directed toward said display surface is transmitted through said cover plate before impinging on said display surface;
    wherein the transmissivity of said semi-transmissive material is changeable such that the intensity of the brightness of said exterior light transmitted through said cover plate is controlled, and the entire driving information projected from said display surface is visible from said driver's seat; and
    wherein said cover plate is positioned at such an angle with respect to the direction of travel of the exterior light and at such an angle with respect to said reflecting member whereby a substantial portion of the exterior light that is reflected from said cover plate is not projected toward the vicinity of said driver's seat.

2. A display according to claim 1, wherein said display means comprises a light emitting type display element.

3. A display according to claim 2, wherein said display means comprises a fluorescent display tube.

4. A display according to claim 2, wherein said display element comprises a light emitting diode.

5. A display according to claim 2, wherein said display element comprises a transmissible type liquid crystal equipped with a backlight.

6. A display according to claim 1, wherein said cover plates are made of a photochromic material.

7. A display according to claim 1, wherein said cover plate comprises liquid crystal cells that are coupled to voltage means for adjustably applying voltage to said liquid crystal cells, thereby varying the transmissivity of said liquid crystal cells.

8. A display according to claim 7, wherein said voltage means comprises an adjusting dial to be operated by a driver.

9. A display according to claim 7, wherein said voltage means comprises a light detector that senses the intensity of said exterior light and provides an output signal such that the voltage means automatically adjusts the level of the voltage applied to said liquid crystal cells in response to said output signal.

10. A display for a vehicle comprising:
    an instrument panel disposed between a windshield glass and a driver's seat of a vehicle;
    a reflecting member disposed in said instrument panel and having a reflector surface that faces said driver's seat, a steering column cover disposed between said instrument panel and said driver's seat, said steering column cover having a display accommodating portion;
    a light-emitting display means disposed in said display accommodating portion for displaying driving information by emitting light, said display means having a display surface which displays said driving information and which faces said reflecting surface, wherein said driving information is projected onto said reflecting surface from said display surface and is further reflected from said reflecting surface in the general direction of said driver's seat; and
    contrast means for controlling the contrast between light-emitting portions of said display surface and non-light-emitting portions of said display surface such that said contrast is sufficiently high as to be visible form said driver's seat in the presence of exterior light impinging on said display surface, said contrast means comprising a cover plate of a semi-transmissive material that reduces the brightness intensity of exterior light impinging on said display surface, said cover plate being positioned between said display surface and said reflecting member such that exterior light directed toward said display surface is transmitted through said cover plate before impinging on said display surface;

wherein the transmissivity of said semi-transmissive material is changeable such that the intensity of said exterior light transmitted through said cover plate is controlled, and the entire driving information projected from said display surface is visible from said driver's seat and;

wherein said cover plate is positioned at such an angle with respect to the direction of travel of the exterior light and at such an angle with respect to said reflecting member whereby a substantial portion of the exterior light that is reflected from said cover plate is not projected toward the vicinity of said driver's seat.

11. A display according to claim 10, wherein said cover plates are made of liquid crystal cells whose transmissivity can be changed electrically.

12. A display according to claim 10, wherein said cover plates are made of a photochromic material whose transmissivity can be changed in response to light.

* * * * *